United States Patent [19]
Yamaki et al.

[11] Patent Number: 6,025,077
[45] Date of Patent: Feb. 15, 2000

[54] SILICONE EMULSION COATING COMPOSITION AND PROCESSES FOR THE PREPARATION THEREOF

[75] Inventors: Takeyuki Yamaki; Minoru Inoue; Kazuo Seto, all of Kadoma; Hideya Ariga; Akihiko Ohashi, both of Nagoya, all of Japan

[73] Assignee: Matsushita Electric Works, Ltd., Osaka, Japan

[21] Appl. No.: 09/077,189

[22] PCT Filed: Dec. 12, 1997

[86] PCT No.: PCT/JP97/04597

§ 371 Date: May 26, 1998

§ 102(e) Date: May 26, 1998

[87] PCT Pub. No.: WO98/26019

PCT Pub. Date: Jun. 18, 1998

[30] Foreign Application Priority Data

Dec. 13, 1996 [JP] Japan ..................................... 8-334025
Dec. 13, 1996 [JP] Japan ..................................... 8-334026

[51] Int. Cl.$^7$ ...................................... B32B 9/04
[52] U.S. Cl. .......................... 428/447; 524/588; 524/837; 106/287.12
[58] Field of Search ..................................... 524/837, 588, 524/839, 590; 525/902; 106/287.12; 428/447

[56] References Cited

U.S. PATENT DOCUMENTS 4,496,687  1/1985  Okada et al. .
4,769,405  9/1988  Kondo et al. .
5,188,899  2/1993  Matsumoto et al. ..................... 428/405

FOREIGN PATENT DOCUMENTS 3-281538  12/1991  Japan .
7-247434  9/1995  Japan .
9-208902  8/1997  Japan .

*Primary Examiner*—Robert Dawson
*Assistant Examiner*—Jeffrey B. Robertson
*Attorney, Agent, or Firm*—Burns, Doane, Swecker & Mathis, L.L.P.

[57] ABSTRACT

A composition of the present invention comprises organosiloxane partial hydrolyzate represented by a formula $R_2{}^aSiO_b(OR^1)_c(OH)_d$ and having a weight-average molecular weight of 600–5,000 in polystylene conversion, (B) colloidal silica, (C) emulsifying agent and (D) water. Its manufacturing method comprises, for example, a step of mixing the mixed (A), (B) and (D) constituents with the (C) constituent, whereby the composition of silicone emulsion coating material which is stable as an emulsion for a long term and capable of being hardened at low temperatures and as heated and forming a hardened film excellent in the weatherability, durability and so on, as well as its manufacturing method can be provided.

14 Claims, No Drawings

SILICONE EMULSION COATING COMPOSITION AND PROCESSES FOR THE PREPARATION THEREOF

TECHNICAL FIELD

This invention relates to a composition of silicone emulsion coating material capable of forming a film excellent in the weatherability, durability and so on and to a method for manufacturing such composition. It is also possible to obtain an excellent hardened coating by coating a proper organic coating substrate with such composition of silicone emulsion coating material, and resultant coated products having the hardened film will be also extremely useful.

BACKGROUND ART

Since organic solvent series coatings discharge to the atmosphere their diluting organic solvent upon being used, they are regarded as one of important factors of global environmental problem. As a countermeasure therefor, water is employed as the diluting agent instead of the organic solvent, and emulsion coating materials emulsified through an emulsifying agent are employed.

For the emulsion coating material, ones of acrylics, urethanes and acryl silicones will form a main current. However, the coating of such emulsion coating material is deteriorated in the weatherability. Accordingly, a provision of an emulsion coating material which can form a film excellent in the weatherability has been demanded.

As the coating basis capable of forming the coating excellent in the weatherability, a reactive silicone compound having at molecular end alkoxide radical or silanol radical has been known. However, the reactive silicone compound could have been present stably within the organic solvent but has been difficult to be kept emulsified for a long term even when the compound is emulsified with water and an emulsifying agent added, since the alkoxide radical or silanol radical of the reactive silicone compound reacts with water for condensation polymerization so as to apt to cause a gelation, precipitation or the like to occur. Due to this, it has been required to control the reactivity of the reactive silicone compound with respect to water, in order to attain the stable emulsification for a long term of the reactive silicone compound.

Accordingly, ones in which silicone oil controlled in the reactivity to water by closing the molecular ends is employed as a coating base material are forming the main current of the silicone emulsion coating material. Since silicone oil is inferior in the reactivity, however, the crosslinking reaction within the coated film is difficult to advance, and any highly durable silicone coating cannot be obtained. Due to this, the silicone emulsion coating material the coating base material of which is silicone oil is mainly employed as a surface treatment material in the field of fabrics only, and cannot be employed as the coating material in the field of coating.

In WPI Acc Publication No. 95-363696/199547, for example, there has been suggested a three-dimensional, crosslinkable, water-dispersed silicone resin composition consisting of (A) polyorganosiloxane resin particulate matter of a softening point 50–250° C., (B) water, (C) an emulsifying agent and (D) an emulsion of a specific polyorganosiloxane containing in 1 molecule at least one of hydroxyl radical or hydrolyzable radical. The particulate matter of polyorganosiloxane employed in this composition is, while not specifically limited, the reactive silicone having silanol radical in the molecule. However, its shape is particulate as being solid, and its molecular weight should preferably be more than 5,000 (Embodiment in the above publication), and the reactivity of the silanol radical with respect to water is considered low. Due to this, it is considered that a stable water-dispersed silicone is enabled. In order to form a hardened coating of this composition, however, it is required to cause to occur a condensation reaction of the silanol radical which is low in the reactivity, and a heat treatment at a high temperature of more than 200° C. is required therefor, so as to be unable to cope with conditions for low temperature hardening. Further, a manufacturing method for this known compound has involved complicated works, in requiring steps of finely crushing and dispersing the particulate matter and so on.

In order to render the silicone emulsion coating material using a reactive silicone compound as the coating base material to be able to cope with the low temperature hardening conditions, there has been suggested in Japanese Patent Laid-Open Publication No. 58-101153 a method for rendering a silicone emulsion coating material to be hardened at room temperatures by an addition of such hardening catalyst as octylic acid tin or the like to the material.

The silicone emulsion composition disclosed in this publication is a three-solution mixture type silicone emulsion composition consisting of (a) a silicone emulsion of organosiloxane partial hydrolyzate having in 1 molecule more than two of silanol radicals, anionic emulsifying agent and water, (b) a uniformly dispersed solution of a reaction product of amino functional silane or its hydrolyzate with an acid anhydride and coloidal silica, and (c) a hardening catalyst. When applied to a substrate, this composition forms a coating having a rubber elasticity mainly according to two-dimensional crosslinking.

The above organosiloxane partial hydrolyzate employed in the composition is a sort of the reactive silicone compound and, while not limited, its molecular weight is disclosed to be more than 10,000 desirably (page 3, right column, line 6–8 of the publication). In case of such large molecular weight, a proportion in molecule of the silanol radical which participates in the reaction with water is almost zero, and the reactivity of organosiloxane partial hydrolyzate with respect to water is low. Because of this, the stability as an emulsion is considered to be seemingly high.

In the silicone emulsion composition disclosed in the above publication, however, the hardening catalyst is an essential component since no hardening occurs without the hardening catalyst. When organosiloxane partial hydrolyzate is made to coexist with the hardening catalyst, the crosslinking reaction of organosiloxane partial hydrolyzate is apt to progress. Due to this, such inexpediences as a gellation of the emulsion, white turbidity of the hardened coating and the like are apt to occur, and also there is a problem that costs are made high by the use of the hardening catalyst.

DISCLOSURE OF THE INVENTION

An object of the present invention is to provide a composition of silicone emulsion coating material stable as an emulsion for a long term, and capable of attaining a low temperature hardening and a heating hardening even in the absence of hardening catalyst and forming a hardened film excellent in the weatherability, durability and so on, as well as a method for manufacturing such composition.

In the present invention, in this case, the composition of silicone emulsion coating material is formed with such constituents (A), (B), (C) and (D) contained as follows:

(A) Organosiloxane partial hydrolyzate represented by an average composition formula (hereinafter referred to as formula I) of $R^2{}_a SiO_b(OR^1)_c(OH)_d$ (wherein $R^1$ and $R^2$ denote monovalent hydrocarbon radical, and a, b, c and d are figures satisfying the relationship of a+2b+c+d=4, $0 \leq a < 3$, $0 < b < 2$, $0 < c < 4$ and $0 < d < 4$) and its weight-average molecular weight is 600–5,000 in polystyrene conversion; (B) a colloidal silica; (C) an emulsifying agent; and (D) water.

In the composition of silicone emulsion coating material of the present invention, it is desirable that silica component in the above (B) constituent is at a ratio of 5 to 100 wt. % with respect to the above (A) constituent.

In the composition of silicone emulsion coating material of the present invention, it is desirable that the above (D) constituent is of a content at a ratio of 50 to 90 wt. % to the whole of the composition of silicone emulsion coating material.

In the composition of silicone emulsion coating material of the present invention, further a nonionic urethane acryl block copolymer can be contained.

The nonionic urethane acryl block copolymer is desirably of a content at a ratio of 0.1 to 10 wt. % with respect to a sum weight of the (A) constituent and the silica component in the (B) constituent. In the composition of silicone emulsion coating material of the present invention, further a pigment can be contained.

In the composition of silicone emulsion coating material of the present invention, there may be contained (E) a straight-chain polysiloxane diol containing hydroxyl radicals at both ends and represented by a general formula (hereinafter referred to as formula II) of $HO(R^3{}_2 SiO)_n H$ (wherein $R^3$ denotes monovalent hydrocarbon radical, and "n" is an integer more than 3).

In the composition of silicone emulsion coating material of the present invention, it is desirable that "n" in the general formula representing the straight-chain polysiloxane diol containing hydroxyl radicals at both ends is in a range of $3 \leq n \leq 50$.

Further in the composition of silicone emulsion coating material of the present invention, it is desirable that the content of the (E) constituent is at a ratio of 1 to 50 wt. % with respect to the sum of the (A) constituent and silica component in the (B) constituent.

A first manufacturing method for the composition of silicone emulsion coating material according to the present invention comprises the steps of obtaining a mixture containing the (A) and (B) constituents by mixing hydrolyzing organosilane represented by a general formula (hereinafter referred to as a formula III) of $R^2{}_n Si(OR^1)_{4-n}$ (in which $R^1$ and $R^2$ denoting monovalent hydrocarbon radical and "n" being an integer of 0–3), acidic colloidal silica, and mixing at least the (C) constituent among the (C) constituent and additional (D) constituent.

In the above first manufacturing method, it is desirable that the (D) constituent used in mixing the hydrolyzing organosilane, acidic colloidal silica and (D) constituent is of an amount at a ratio of 0.3 to 2.0 mol per an equivalent weight to 1 mol of $OR^1$ radical in the hydrolyzing organosilane.

A second manufacturing method for the composition of silicone emulsion coating material according to the present invention comprises the steps of obtaining a desolvated substance by desolvating the organic solvent from the mixture of the (A) and (B) constituents containing the organic solvent, and mixing the desolvated substance with the (C) and (D) constituents.

In the foregoing first or second manufacturing method, the steps of obtaining a pigment base by mixing nonionic urethane acryl block copolymer, the (D) constituent and pigment, and adding this pigment base may be further included.

THE BEST MODE FOR CARRYING OUT THE INVENTION

Organosiloxane partial hydrolyzate used as the (A) constituent of the composition according to the present invention (hereinafter referred to as "organosiloxane hydrolyzate (A)") is a silicone compound having at molecular ends both of $—OR^1$ radical and $—OH^1$ radical (either of which is bonded directly to silicon atom) and three dimensionally crosslinking. $R^1$ and $R^2$ in the foregoing formula (I) representing organosiloxane partial hydrolyzate (A) denote the monovalent hydrocarbon radicals and may be mutually identical one or different ones.

$R^2$ may not be specifically limited so long as the same is monovalent hydrocarbon radical but a substituted or non-substituted monovalent hydrocarbon radical of a carbon number 1 to 8 will be the optimum, enumeratable examples of which will be such alkyl radicals as methyl radical, ethyl radical, propyl radical, butyl radical, pentyl radical, hexyl radical, heptyl radical, octyl radical and the like; such cycloalkyl radicals as cyclopentyl radical, cyclohexyl radical and the like; such aralkyl radicals as 2-phenylethyl radical, 3-phenylpropyl radical and the like; such aryl radicals as phenyl radical, tolyl radical and the like; such alkenyl radicals as vinyl radical, allyl radical and the like; such halogen substituted hydrocarbon radicals as chloromethyl radical, γ-chloropropyl radical, 3,3,3,-trifluoropropyl radical and the like; and such substituted hydrocarbon radicals as γ-methacryloxypropyl radical, γ-glycidoxypropyl radical, 3,4-epoxycyclohexyl ethyl radical, γ-mercaptopropyl radical and the like. Among them, alkyl radical and phenyl radical of carbon number 1–4 are desirable in view of easy synthesizing and easy availability.

Further, while $R^1$ may suffice the purpose so long as the same is monovalent hydrocarbon radical and is not specifically limited, alkyl radicals of carbon number 1–4, for example, will be the obtimum. For preparing process of organosiloxane partial hydrolyzate (A), while not specifically limited, and referring to an example of a case of obtaining one of which $R^1$ in the formula (I) is alkyl radical ($OR^1$ is alkoxy radical), for example, it is possible to obtain organosiloxane partial hydrolyzate (A) by partially alkoxylating silanol radical of silanol-radical-containing polyorganosiloxane which can be obtained by hydrolyzing, with a large amount of water through any known process, one or more than two of hydrolyzing organosilane selected from the group consisting hydrolyzing organochlorosilane and hydrolyzing organoalkoxysilane. In an event when the hydrolysis is carried out with hydrolyzing organoalkoxysilane in this preparing process, further, organosiloxane partial hydrolyzate (A) in which unreacted alkoxy radical and silanol radical coexist can be obtained by hydrolyzing only part of alkoxy radical with the amount of water regulated, so that there may arise a case in which the foregoing treatment for partially alkoxylating silanol radical in silanol-radical-containing polyorganosiloxane can be omitted.

For the foregoing hydrolyzing organochlorosilane, while not specifically limited, there may be enumerated, for example, methyltrichlorosilane,
dimethyldichlorosilane, phenyltrichlorosilane,
diphenyldichlorosilane and the like.

For the foregoing hydrolyzing organoalkoxysilane, while not specifically limited, there may be enumerated, for example, ones of which $R^1$ is alkyl radical in hydrolyzing organosilane represented by the general formula (III). In concrete, examples of tetraalkoxysilane of n=0 are tetramethoxysilane,
tetraethoxysilane and the like, and examples of organotrialkoxysilane of n=1 are
methyltrimethoxysilane,
methyltriethoxysilane,
methyltriisopropoxysilane,
phenyltrimethoxysilane,
phenyltriethoxysilane,
3,3,3-trifluoropropyltrimethoxysilane and the like.
Further, examples of diorgatiodialkoxysilane of n=2 are
dimethyldimethoxysilane,
dimethyldiethoxysilane,
diphenyldimethoxysilane,
diphenyldiethoxysilane,
methylphenyldimethoxysilane and the like, and examples of triorganoalkoxysilane of n=3 are
trimethylmethoxysilane,
trimethylethoxysilane,
triethylmethoxysilane,
trimethylisopropoxysilane,
dimethylisobutylmethoxysilane and the like.

For the catalyst employed for the partial hydrolysis of hydrolyzing organosilane, while not specifically limited thereto, examples of acidic catalyst are such water-soluble acid as hydrochloric acid, nitric acid and the like, such acidic colloidal silica as will be described later and the like, and examples of basic catalyst are aqueous ammonia, basic colloidal silica and the like. When hyrolyzing organoalkoxysilane of which $R^1$ is lower alkyl radical is used as hydrolyzing organosilane, a lower aliphatic alcohol is produced upon its partial hydrolysis, and it is desirable for preparing the composition of the present invention to carry out the desolvation preliminarily to remove this lower aliphatic alcohol, because the lower aliphatic alcohol is an amphiphatic solvent which causes the stability of emulsion deteriorated.

In the formula (I) representing organosiloxane partial hydrolyzate (A), a, b, c and d are figures satisfying the foregoing relationship. In an event when "a" is more than 3, an inconvenience that the hardening of the coating film does not progress well. An event of b=0 results in a monomer, involving a problem that the hardened film cannot be formed. An event when "b" is 2 results in silica ($SiO_2$—not being organosiloxane), and there arises a problem that cracks are caused to occur in the hardened film. When c=0, the molecular ends are only R radical and $OH^1$ radical which is hydrophilic, and the hydrophilic nature of the whole molecules increase, so as to cause a long term stability of the emulsion not to be attainable. When c=4, result is a monomer, which involves a problem that no hardened film can be formed. When d=0, the molecular ends are only of such hydrophobic radicals as $R^1$ radical and $OR^1$ radical so that, while it is advantageous to the long term stability of the emulsion, the $OR^1$ radical is in lack of closslinking reactivity upon hardening the coating film and sufficiently hardened film cannot be obtained. When d=4, result is a monomer, and there is a problem that the hardened film cannot be formed.

The weight-average molecular weight or organosiloxane partial hydrolyzate (A) is in the range of 600 to 5,000 in the polystyrene conversion. When less than 600, there arises an inconvenience that cracks occur in the hardened coating film, and, when exceeding 5,000, there arises a problem that the hardening does not progress well.

Organosiloxane partial hydrolyzate (A) has the above structure, and its weight-average molecular weight is in the above predetermined range, so that its reactivity is high. Consequently, the composition of the present invention which includes this does not require the hardening catalyst for the hardening of its film, and allows not only the heat-hardening but also a low-temperature hardening to be realizable. Further, organosiloxane partial hydrolyzate (A) shows excellent balance of hydrophilic-hydrophobic nature at the molecular end radicals, notwithstanding the high reactivity, so that the emulsification can be kept stable for a long term.

Colloidal silica employed as the (B) constituent of the composition of the present invention (hereinafter referred to as "colloidal silica (B)") is a constituent which provides to the coating film an excellent film forming properties, so that the coat hardness of the coating film can be elevated.

The silica component in colloidal silica (B) is, while not specifically limited, at a ratio desirably of 5 to 100 wt. % and more desirably 15 to 80 wt. %, for example, with respect to organosiloxane partial hydrolyzate (A). When the silica component is less than 5 wt. %, there appears a tendency that the desired coating strength cannot be obtained and, when 100 wt. % is exceeded, the uniform dispersion of the colloidal silica (B) becomes difficult and there may arise an incovenience that organosiloxane partial hydrolyzate (A) is caused to be gelated and so on.

For colloidal silica (B), while not specifically limited, such ones as dispersed in water or ones dispersed in non-aqueous organic solvent such as alcohol and the like can be used. In general, such colloidal silica contains 20–50 wt. % of silica as a solid component, and the loads of silica can be determined from this value. Colloidal silica dispersed in water is aqueous, and there is an advantage that it can be led into the emulsion as it is. Colloidal silica dispersed in the non-aqueous organic solvent is to cause the stability of emulsion deteriorated, and cannot be directly led into the emulsion. When used as a reactive catalyst of the hydrolyzing organosilane represented by the foregoing general formula (III), colloidal silica dispersed in the non-aqueous organic solvent can be obtained as a mixture of the (A) and (B) constituents dispersed in the non-aqueous organic solvent. By desolvating the organic solvent from this mixture, the emulsification as the mixture of the (A) and (B) constituents is made possible. In colloidal silica dispersed in water, further, water existing as other component than the solid component can be used as a hardening agent for the hydrolyzing organosilane represented by the general formula (III).

While colloidal silica dispersed in water is normally made from water-glass, it is easily available as a marketed article. Further, colloidal silica dispersed in the organic solvent can be easily prepared by substituting an organic solvent for water in colloidal silica dispersed in water. Such colloidal silica dispersed in the organic solvent is also easily available as the marketed article, similarly to colloidal silica dispersed in water. While not specifically limited, the type of organic solvent in which colloidal silica is dispersed will be, for example, such lower aliphatic alcohols as methanol, ethanol, isopropyl alcohol, n-butanol, isobutanol and the like; such ethylene glycol derivatives as ethylene glycol, ethylene glycol monobutyl ether, ethylene glycol monoethyl ether acetate and the like; such diethylene glycol derivatives as diethylene glycol derivatives as diethylene glycol, diethylene glycol monobutyl ether and the like; and diacetone alcohol and the like, and one or more than two selected from the group consisting of these items may be employed.

Concurrently with these hydrophilic organic solvents, it is also possible to use toluene, xylene, ethyl acetate, butyl acetate, methyl ethyl ketone, methyl isobutyl ketone, methyl ethyl ketoxyme and the like. Among them, preferable will be the lower aliphatic alcohols in view of the easiness of the desolvation.

The emulsifying agent used as the (C) constituent of the composition of the present invention (hereinafter referred to as "emulsifying agent (C)") is the emulsifying agent for dispersing organosiloxane partial hydrolyzate (A) in water as emulsion particles.

For the emulsifying agent (C), while not specifically limited, at least one selected from the group consisting of, for example, general protective colloid and a surface-active agent can be used.

For the protective colloid, while not specifically limited, enumeratable examples will be polyvinyl alcohol, denatured polyvinyl alcohol, water-soluble cellulose derivative (such as ethyl cellulose, methyl cellulose, hydroxy cellulose and the like), starch, agar-agar, gelatin, gum arabic, alginic acid, stylene-maleic anhydride copolymer salt, maleic polybutadiene derivative, naphthalenesulfonic acid condensate, polyacrylate, acrylic acid amide, acrylic acid ester and the like.

For the surface-active agent, while not specifically limited, enumeratable examples will be such anionic surface-active agents as alkylbenzenesulfonate, alkylnaphthalenesulfonate, fatty acid chloride, rosinate, dialkylsulfosuccinate, hydroxyalkanesulfonate, alkanesulfonate, alkylsulfate salt, alkylphosphate salt, polyoxyethylene alkylarylether sulfate salt and the like; such cationic surface-active agents as alkylamine salt, dialkylamine salt, tetraalkylammonium salt and the like; such nonionic surface-active agents as polyoxyethylenealkylether, polyoxyethylenealkylarylether, polyoxyethylenesorbitan aliphatic acid ester, oxyethyleneoxypropylene copolymer, polyhyrdric alcohol-aliphatic acid partial ester, polyoxyethylenic polyhydric alcohol-aliphatic series ester, and the like; and such ampholytic surface active agents as alkylaminopropionic acid, alkyliminodipropionic acid, imidazolinecarboxylic acid, alkylbetain, sulphobetain, amine oxide and the like. Among them, anionic or nonionic surface active agents are desirable for the sake of the long term stability of the emulsion.

For the content of the emulsifying agent (C) in the composition of the present invention, while not specifically limited, desirable ratio with respect to the sum of organosiloxane partial hydrolyzate (A) and the silica component of colloidal silica (B) is, for example, 1 to 30 wt. % and, more desirably 2 to 15 wt. %. When less than 1 wt. %, there is a tendency that the emulsification is difficult while, when exceeding 30 wt. %, there arises a risk that the hardening characteristics and weatherability are deteriorated.

For the content of water used as the (D) constituent of the composition of the present invention (hereinafter referred to as "water(D)"), while not specifically limited, desirable ratio in the total weight of the composition is, for example, 50 to 90 wt. % and, more desirably 60 to 80 wt. %. When the content of water (D) is out of the above range, the emulsion is deteriorated in the stability, and there is a tendency of causing such inconvenience that a sediment takes place and so on to occur.

The composition of the present invention can contain non-aqueous-soluble organic solvent as occasion demands, such as, for the purpose of improving the stability of molecular weight of the organosiloxane partial hydrolyzate (A), and so on. For the non-aqueous-soluble organic solvent usable, examples will be, while not specifically limited thereto, such ones of which the solubility with respect to 100 g of water at 25° C. is less than 1 g as benzene, toluene, xylene and the like. When such non-aqueous-soluble organic solvent is used, its content should preferably be in a range of not causing such problems as environmental ones, for example, at a ratio of 0 to 20 wt. % desirably or 0 to 10 wt. % more desirably, with respect to the total weight of the composition.

The composition of the present invention may contain, as occasion demands, a thickening agent, a protective colloid or the like which is usually added for improving the stability of the emulsion. The protective colloid can be used not only as the foregoing emulsifying agent but also as a viscosity increasing agent.

For the above thickening agent or the protective colloid, enumeratable examples will be, while not specifically limited, such celluloses as hydroxyethyl cellulose, hydroxypropyl cellulose, hydroxypropylmethyl cellulose, carboxymethylcellulose and the like; such polysaccharides as guar gum, low-cast bean gum and the like; such animal proteins as gelatin, casein and the like; such water-soluble polymer compounds as soluble starches, alginic acids, polyvinyl alcohol, polyacrylic sodium and the like; and so on.

Nonionic urethane acryl block copolymer can be also used as the thickening agent. Nonionic urethane acryl block copolymer shows a property of association with respect to emulsion particles, and is capable of improving the composition of the present invention in the stability of emulsion and also of providing to the composition of the present invention an excellent flow, leveling and film-thickening properties. For such nonionic urethane acryl block copolymer, its marketed article is easily available. When the composition of the present invention contains nonionic urethane acryl block copolymer, its content is, while not specifically limited, at a ratio of 0.1 to 10 wt. % desirably, or 1 to 5 wt. % more desirably, for example, with respect to the sum amount of the (A) constituent and the silica component in the (B) constituent. In the case of less than 0.1 wt. %, there is a tendency that the foregoing network is not formed sufficiently and, in the case of exceeding 10 wt. %, there is a tendency that the hardened film is deteriorated in the weatherability.

Further, the composition of the present invention may contain the (E) constituent. The straight-chain polysiloxane diol containing hydroxyl radicals at both ends as the (E) constituent (hereinafter referred to as "both-end hydroxyl radical containing straight chain polysiloxane diol (E)" or simply as "polysiloxane diol (E)") is a constituent which promotes the hardening of the composition for more reliably attaining the low temperature hardening, and provides to the coating hardened film of the composition the tenacity (flexibility) for improving the film in its crack resisting ability.

In the foregoing general formula (II) representing the both-end hydroxyl radical containing straight chain polysiloxane diol (E), $R^3$ is not specifically limited so long as the same is the monovalent hydrocarbon radical, but the same one as that described before as $R^2$ in the formula (I), for example, may be used. Among the straight-chain polysiloxane diols having such $R^3$, dimethyl siloxane diol and methylphenyl siloxane diol are desirable from the view point that the hardened film is not deteriorated in the weatherability, the film is further improved in the crack resisting ability, and the easiness of availability.

The both-end hydroxyl group containing straight-chain polysiloxane diol (E) is a molecule relatively poor in the reactivity, because it has no other reactive radical than the OH radical at molecular end. Due to this, polysiloxane diol (E) is in a state where the molecular end only is bonded with the (A) constituent or not bonded as yet. The main chain of polysiloxane diol (E) is of two dimensional structure and is present in a state relatively easily movable, so that any shrinkage of hardening upon crosslinking of the (A) constituent can be absorbed to be able to prevent the crack from occurring. Further, since polysiloxane diol (E) is capable of relatively easily bonding its both end hydroxyl radicals with $OR^1$ radicals in the (A) constituent, and of forming at lower temperatures a structure as the crosslinking agent between molecules of the (A) constituent. Because of this, the hardening of the coated film at lower temperatures can be more reliably established, so long as the hydroxyl group of polysiloxane diol (E) matching with the $OR^1$ radical in the (A) constituent is present. That is, with polysiloxane diol (E), it is possible to obtain both effect of softening agent and hardening promotion agent for the coated film. These effect will be made the maximum with polysiloxane diol (E) of which "n" in the formula (II) is in the range of $3 \leq n \leq 50$ (more desirably be 5 to 45). Since polysiloxane diol (E) is of the straight chain, the hardening stress is easily absorbed, and the network structure as the crosslinking agent can be easily formed. The larger the value "n", the larger the effect as the softening agent, and the effect as the softening agent is not shown when "n" is less than 3. Since the smaller the value "n", the higher the reactivity of the end —OH radical, and the effect as the hardening agent is higher. When "n" is larger than 50, the reactivity of the end —OH radical is lowered, so that there is a tendency that the effect as the hardening agent is lowered and its molecule is enlarged, and there may arise a risk that the agent is not taken into the (A) constituent so as to cause a phase separation, white turbidity and so on.

In this case, the content of polysiloxane diol (E) in the composition varies depending on the magnitude of "n" and, while not specifically limited, at a ratio of, for example, 1 to 50 wt. % desirably or 5 to 20 wt. % more desirably, with respect to the sum of the (A) constituent and silica component in the (B) constituent. When less than 1 wt. %, no sufficient network structure as the crosslinking agent can be formed and, when 50 wt. % is exceeded, there arises a tendency of causing such inconvenience that polysiloxane diol (E) not bonded as yet hinders the coated film from hardening. By mixing in the (A) constituent a proper amount of polysiloxane diol (E) from the one of large "n" to the one of small "n", the composition of silicone emulsion coating material capable of forming the hardened film which is higher in the hardening property at a low temperature and improved in the crack resistance can be provided.

The composition of the present invention may contain a pigment, as occasion demands. For the pigment, while not specifically limited, examples are such organic pigments as carbon black, quinacridone, naphthol red, phthalocyanine green, Hansa yellow and the like; such inorganic pigments as titanium oxide, barium sulfate, red oxide, composite metal oxide and the like; and combinations of one or more than two selected from these groups may also be used without any inconvenience.

For the process of dispersing the pigments, any process of directly dispersing pigment powder by means of ordinary dyestuff mill, paint shaker and the like involves a risk of destroying the emulsion and causing such incovenience as phase separation, gelation, precipitation occurrence and the like. As the process of dispersing the pigments, therefore, such process that a pigment base prepared by dispersing the pigment in water through a dispersant (desirably at a high concentration) is added to the emulsion and stirring them to a proper extent. Marketed article of the pigment base is easily available. The pigment base may contain, other than the dispersant, a wetting agent, viscosity control agent and the like. As an example of the dispersant, by the way, the foregoing nonionic urethane acryl block copolyer may be enumerated, while not limited thereto.

The process for dispersing the pigment base is not specifically limited but may be any ordinary dispersing process. At this time, a dispersing agent, coupling agent and the like may also be used.

The composition of the present invention may contain, as occasion demands, other constituents than those in the above, such as a leveling agent, dye, metal powder, glass powder, anti-fungus agent (desirably inorganic anti-fungus agent), anti-oxidizing agent, antistatic agent, ultraviolet light absorber, antiformer, mildew-proofing agent and the like, to the extent of causing no ill affection on the effect of the present invention.

While the composition of the present invention is not required to contain the hardening catalyst since the low temperature hardening and heating hardening can be carried out without any hardening catalyst, it is possible to contain the hardening catalyst as occasion demands, for the purpose of promoting the hardening of the coated film. For the hardening catalyst, while not specifically limited, enumeratable examples will be alkyltitanates; such carboxylic acid metallic salts as tin octylic acid, tin laurate, iron octylic acid, lead octylic acid, dibutyltin dilaurate, dioctyltin dimaleate and the like; such titanium compounds as tetraisopropyl titanate, tetrabutyl titanate, titanium tetraacetylacetonate and the like; such alkaline metal salts as lithium acetate, sodium formate, potassium phosphate and the like; such amine compounds or their hydrochlorides as n-hexylamine, guanidine, dibutylamine-2-hexoate, dimethylamine acetate, ethanolamine acetate. It is desirable that, upon their use, these hardening catalysts are prepared in the form of emulsion with the emulsifying agent (C) and water (D) preliminarily according to any ordinary process.

For the process of coating with the composition of the present invention, while not specifically limited, any of such ordinary, various coating processes as brushing, spraying, dipping, flowing, rolling, curtain coating, knife coating and the like may be selected. When the composition is diluted, a dilution with water is desirable but, as occasion demands, it is possible to add to the composition a small amount of such organic solvent of relatively high boiling point as butyl carbitol, ethyl cellosolve, butyl cellosolve and the like, for the purpose of adjusting the leveling or drying characteristics of the coated surface.

For the substrate to be coated with the composition of the present invention (also being the substrate employed as the coated artic les according to the present invention), further, enumeratable examples will be, while not specifically limited, inorganic substrate, organic substrate, inorganic-organic composite substrate, coated substrate having on either one of its surfaces at least a layer of inorganic matter film and/or at least a layer of organic matter film, and the like.

For the inorganic substrate, while not specifically limited thereto, enumeratable examples will be metallic substrates;

glass substrates; enameled articles; such inorganic building materials as soluble glass veneer, inorganic hardened articles and the like; ceramics; and the like.

For the metallic substrate, while not specifically limited, enumeratable examples will be non-ferrous metals [for example, aluminum (JIS-H4000 and the like), aluminum alloys (duralumin and the like), copper, zinc and the like], iron steels [for example, rolled steel (JIS-G3101 and the like), molten zinc plated steel (JIS-G3302 and the like), (rolled) stainless steel (JIS-G4304, G4305 and the like) and the like], tinplate (JIS-G3303 and the like) and all other metals (including alloys).

For the glass substrate, while not specifically limited, enumeratable examples will be sodium glass, pyrex, silica glass, non-alkali glass and the like.

The foregoing enameled articles are ones made by baking a glassy enamel paint on the surface of metal to coat it. For its blanket metal, enumeratable examples are mild steel sheet, steel plate, cast iron, aluminum and the like, while not specifically limited thereto. For the enamel paint, too, an ordinary one may be used, and no specific limitation is required.

For the soluble water veneer plate, such decorative laminate that formed by applying and baking sodium silicate on a slate or the like cement substrate is referred to.

For the inorganic hardened articles, while not specifically limited, all such substrates of inorganic material hardened and molded as a fibre-reinforced cement plate (JIS-A5430 and the like), ceramics sizing (JIS-A5422 and the like), wood-wool cement plate (JIS-A5405 and the like), pulp cement plate (JIS-A5414 and the like), slate/wood-wool-cement laminated sheet (JIS-A5426 and the like) gypsum board products (JIS-A6901 and the like), clay tile (JIS-A5208 and the like), thick slate (JIS-A5402 and the like), pottery tile (JIS-A5209 and the like), building concrete block (JIS-A5406 and the like), terrazzo (JIS-A5411 and the like), prestressed concrete double T slab (JIS-A5412 and the like), ALC panel (JIS-A5416 and the like), hollow prestressed concrete panel (JIS-A6511 and the like), ordinary brick (JIS-R1250 and the like) and the like are referred to.

In conventional silicone coating, an attack of alkaline component effluent from the soluble water veneer or inorganic hardened article is apt to occur and a long term durability is unable to attain, so that a sealing treatment has been required for the substrate, whereas the stainproof composition of silicone emulsion coating material is characterized in that the long term durability can be attained since the emulsifying agent (C) is contained so as to be corrosion-resistant to the alkaline component.

For the ceramic substrate, while not specifically limited, enumeratable examples are alumina, zirconia, silicon carbide, silicon nitride and the like.

For the plastics substrate, while not specifically limited, enumeratable examples are such thermosetting or thermoplastic plastics as polycarbonate resin, acrylic resin, ABS resin, vinyl chloride resin, epoxy resin, phenolic resin and the like, such fibre-reinforced plastics (FRP) as these plastics reinforced by such organic fibres as nylon fibre, and the like. Since the composition of the present invention is aqueous and small in the amount of organic solvent, the composition can be applied to a substrate relatively easily attacked by the organic solvent such as the plastics.

For the inorganic-organic composite substrate, while not specifically limited thereto, enumeratable examples will be the fibre-reinforced plastics (FRP) of the foregoing plastics reinforced by such inorganic fibres as glass fibres, carbon fibres and the like.

For the organic film which forming the coated substrate, while not specifically limited, enumeratable examples will be hardened films of coating materials containing acrylic, alkyd, polyester, epoxy, urethane, acrylic silicone, chlorinated rubber, phenolic, melamine and the like series organic resins.

For the inorganic film forming the coated substrate, while not specifically limited, enumeratable examples will be hardened films of coating materials containing such inorganic resins as silicone resins and the like.

In coating the substrate with the composition of the present invention, there is an event where the composition of the present invention applied as it is shows a difficulty in attaining a good adherence depending on the material and surface conditions of the substrate, so that, as occasion demands, it may be also possible to preliminarily form a primer layer on the surface of the substrate, prior to the formation of the coated and hardened film of the composition of the present invention. For the primer layer, while not specifically limited to either of organic and inorganic ones, enumeratable examples of the organic primer layer will be a hardened resin layer of organic primer composition containing, as a solid component, more than 10 wt. % of at least one organic resin selected from the group consisting of nylon resin, alkyd resin, epoxy resin, acrylic resin, organic modified silicone resin (such as acrylic silicone resin and the like), chlorinated rubber resin, urethane resin, phenolic resin, polyester resin and melamine resin, and the like; and enumeratable examples of inorganic primer layer will be a hardened resin layer of inorganic primer composition containing, as a solid component, more than 90 wt. % of such inorganic resin as silicone resin or the like resin, and the like.

The thickness of the primer layer is, for example, 0.1 to 50 $\mu$m desirably, or 0.5 to 10 $\mu$m more desirably, while not specifically limited. When this thickness is too small, there arises a risk that the adherence cannot be obtained and, when the thickness is too much, there arises a risk of foaming caused upon being dried. By the way, a substrate which has at least one of the foregoing organic primer layer and/or inorganic primer layer on the surface is included in the category of the coated substrate. That is, the film which the coated substrate has on its surface may be the above primer layer.

For the shape of the substrate, while not specifically limited, enumeratable examples will be a film shape, sheet shape, plate shape, fibrous shape and the like. Further, the substrate may be a molded member of a material in these shapes, a formed member partly comprising at least one of materials of these shapes or their molded member, or the like.

This substrate may be one formed with a single of the various foregoing materials, a composite member of a combination of at least two of the various foregoing materials, or a laminated member of a lamination of at least two of the various foregoing materials.

For the process of hardening the composition of the present invention applied on the substrate, any known process may be employed, and the process needs not be specifically limited. Further, the temperature for the hardening also needs not be specifically limited, and it is possible to set the temperature in a wide range of normal temperatures to the heating temperature in accordance with desired properties of the hardened film.

The thickness of the film formed with the composition of the present invention (hardened film) is not specifically limited but is, desirably, about 0.1 to 20 $\mu$m, for example, or, more desirably, 1 to 10 μm in order that the film is held as stably adhered for a long term, without causing any cracking, peeling or the like to occur.

For the method for manufacturing the composition of the present invention, while not specifically limited, it may be sufficient, for example, to mix and stir the (A), (B), (C) and (D) constituents. For the stirring process, the so-called emulsifying process, while not specifically limited, any known process may be employed, but enumeratable examples will be the emulsifying process with such emulsifier as a homogenizer, homomixer or the like, and so on. In that case, the order of mixing the (A) through (D) constituents may not be specifically limited, but enumeratable examples will be to uniformly mix the (A), (B) and (D) constituents, thereafter to add thereto the (C) constituent or (C) and (D) constituents, and to emulsify them with the above emulsifier.

The method for manufacturing the composition of the present invention is not limited to the one described above. For example, a first manufacturing method or a second manufacturing method according to the present invention may be employed. In the first manufacturing method of the present invention, the hydrolyzing organosilane of the general formula (III), acidic colloidal silica and water (D) are mixed. Then, the hydrolyzing organosiloxane is partially hydrolized by water (D) with the catalytic action of the acidic colloidal silica to produce organosiloxane partially hydrolyzate, and thereby the mixture containing organosiloxane partial hydrolyzate (A) and colloidal silica (B) is obtained. Thereafter, this mixture and emulsifying agent (C) are mixed, water (D) is added in an event when water (D) remains not at all or in a required amount at the above step, and the composition of silicone emulsion coating material is obtained.

For the acidic colloidal silica employed in the first manufacturing method, acidic ones among those above described as colloidal silica (B) may be enumerated. As the acidic colloidal silica, either one of that dispersed in water and the other dispersed in an organic solvent can be used, or even both of them can be used concurrently.

As a concrete example of the hydrolyzing organosilane of the general formula (III) employed in the first manufacturing method, the hydrolyzing organoalkoxysilane or the like as has been described as the raw material for organosiloxane partial hydrolyzate (A) may be enumerated, while not limited thereto.

In the first manufacturing method, the amount of water (D) used in mixing the hydrolyzing organosilane of the general formula (III), acidic colloidal silica (B) and water is not specifically limited, but is at a ratio of, for example, 0.3 to 2.0 mol desirably, or 0.4 to 1.0 mol more desirably, per 1 mol equivalent weight of the $OR^1$ radicals in the hydrolyzing organosilane. In an event when the acidic colloidal silica dispersed in water is used, the above molar amount of water is an amount including water present as other component than the solid component in this water-dispersed acidic colloidal silica. In an event where the acidic colloidal silica dispersed in an organic solvent is used, a desolvating step is later required for removing the organic solvent, but there is a tendency that, with the molar amount of water (D) made less than 0.3 mol, a low-molecular-weight silicone compound in the molecular-weight distribution of organosiloxane partial hydrolyzate (A) is removed out of the series together with the organic solvent at the time of desolvating the organic solvent. When the molar amount of water (D) exceeds 2.0 mol, on the other hand, the can-stability of organosiloxane partial hydrolyzate (A) is deteriorated, and there arises a risk of gelation.

In the first manufacturing method, a pH control may be carried out as occasion demands, in mixing the hydrolyzing organosilane, acidic colloidal silica and water (D). In the second manufacturing method of the present invention, the composition of silicone emulsion coating material is obtained by obtaining a desolvated substance through the desolvation of the organic solvent out of the mixture of the solvent-containing (A) and (B) constituents, and thereafter mixing this desolvated substance with the (C) and (D) constituents.

In the second manufacturing method, the organic solvent contained in the mixture of the (A) and (B) constituents and to be subjected to the desolvation is alcohol produced as a by-product of the hydrolyzing reaction of the hydrolyzing organoalkoxysilane in the case when the hydrolyzing organoalkoxysilane is employed as the raw material of the (A) constituent, or the organic solvent contained in colloidal silica dispersed in the organic solvent in the case when the organic solvent-dispersed colloidal silica is used as the (B) constituent. In view of the easiness of the desolvation, $R^1$ which the hydrolyzing organoalkoxysilane has should desirably be a lower alkyl radical, or the organic solvent contained in the organic solvent-dispersed colloidal silica should desirably be a lower aliphatic alcohol, respectively.

For the desolvating process of the organic solvent, while not specifically limited, a desirable example will be a process of desolvating the organic solvent under the conditions of a heating under normal pressures, normal temperatures under a reduced pressure, or heating under the reduced pressure. In the second manufacturing method, such nonionic surface active agent as shown in the following may be used as a polymerization inhibitor, as occasion demands, for the purposes of inhibiting the reactivity of the mixture of the (A) and (B) constituents from the time of the desolvation to the emulsification, and of maintaining the hardened performance of the hardened film. For the nonionic surface active agent usable as the polymerization inhibitor, while not specifically limited thereto, enumeratable examples will be polyoxyethylene-added nonionic surface active agent of an HLB figure in a range of 5.0 to 20.0, and the like. With the HLB figure out of this range, not only the effect of inhibiting the polymerization is not shown, but also the polymerization may even be promoted.

As concrete examples of the above polyoxyethylene-added nonionic surface active agent employable as the polymerization inhibitor, while not specifically limited, such polyoxyethylene alkyl ethers as polyoxyethylene lauryl ether and the like; such polyoxyethylenealkyl aryl ethers as polyoxyethylene nonyl phenyl ether and the like; such polyoxyethylenesorbitan aliphatic acid esters as polyoxyethylenesorbitan monopalmitate and the like; and so on may be enumerated. These substances may be used independently or concurrently. Further, these polymerization inhibitors may even be used as the emulsifying agent (C).

Loading of the polymerization inhibitor may be, while not specifically limited, 1 to 30 wt. % desirably or 2 to 15 wt. % more desirably, for example, with respect to the sum of the (A) and (B) constituents. When less than 1 wt. %, its effect is not shown and, when exceeding 30 wt. %, the film is deteriorated in the hardened property and weatherability.

WORKING ASPECTS

In the followings, the present invention shall be described in detail with reference to working aspects and comparative examples. Throughout the working aspects and comparative examples, unless specifically defined, all the term "parts" represents "parts by weight", and "%" all represents "weight %". Further, the molecular weight has been measured with a calibration curve prepared by means of a standard polystyrene, through GPC (gell permeation chromatography) performed with HLC8020 of TOHSOH K.K. used as an instrument. Further, the present invention is not limited to the following working aspects.

Initially, preparation examples of the (A) constituent in basic working aspects shall be described.

PREPARATION EXAMPLE A-1

1,000 parts of water and 50 parts of acetone were weighed into a flask to which a stirrer, heating jacket, condenser, dropping funnel and thermometer were mounted, a mixture solution of which was subjected to a hydrolysis at 60° C., while dropping under stirring a solution consisting of 44.8 parts (0.3 mol) of methyltrichlorosilane, 38.7 parts (0.3 mol) of dimethyldichlorosilane, 84.6 parts (0.4 mol) of phenyltrichlorosilane, and 200 parts of toluene.

The stirring was ceased after 40 minutes from termination of the dropping, thus reacted solution was transferred into a separating funnel and was left to stand, therafter a hydrochloric acid water forming a lower one of two-layer separation was removed as separated, next, residual water and hydrochloric acid in toluene solution of organopolysiloxane of an upper layer were removed as distilled off together with an excessive toluene by means of a stripping under a reduced pressure, and thereby a 50% toluene solution of organopolysiloxane containing reactive molecule terminal silanol radical was obtained.

With respect to a mixture solution of 100 parts of the above solution with 5 parts of methyltrimethoxysilane and 5 parts of dimethylmethoxysilane added, an alkoxylation of silanol group was carried out at 60° C., while dropping into the above mixture solution under stirring a solution consisting of dibutyltin dilaurate 0.6 parts and toluene 10 parts. The stirring was ceased after 40 minutes from termination of the dropping, dibutyltin dilaurate and methanol were removed as dilluted off with excessive toluene, and thereby an 80% toluene solution of organosiloxane partial hydrolyzate of a weight-average molecular weight of 2,000 was obtained. This shall be referred to as A-1.

PREPARATION EXAMPLE A-2

A mixture was obtained with 70 parts of methyltrimethoxysilane, 30 parts of dimethyldimethoxysilane, and 30 parts of tetraethoxysilane, the mixture was then diluted with 60 parts of isopropyl alcohol, further a diluted solution of 0.01 stated hydrochloric acid with 40 parts of water was added, and a hydrolysis was carried out at room temperatures under stirring. Thus obtained solution was heated in a constant temperature bath at 60° C., and thereby 30% mixture alcohol solution of organosiloxane partial hydrolyzate of a weight-average molecular weight of 1,500 was obtained. This shall be referred to as A-2.

Next, a preparation example of an (A) and (B) mixture constituents shall be described.

PREPARATION EXAMPLE AB-1

To 70 parts of methyltrimethoxysilane and 30 parts of dimethyldimethoxysilane, 40 parts of water-dispersed acidic colloidal silica (commodity name "SNOWTEX O" by NIS-SAN KAGAKU KOGYO K.K. of a solid component 20%) were added and mixed as stirred. By heating thus obtained solution in the constant temperature bath at 60° C., a 40% methanol solution of colloidal silica-mixed organosiloxane partial hydrolyzate of a weight-average molecular weight of 1,200 was obtained. This shall be referred to as AB-1.

PREPARATION EXAMPLE AB-2

To 100 parts of methyltrimethoxysilane, 40 parts of water-dispersed acidic colloidal silica ("SNOWTEX O" by NISSAN KAGAKU KOGYO K.K. of the solid component 20%) and 40 parts of methanol silica sol as being acidic colloidal silica (commodity name "MA-ST" by NISSAN KAGAKU KOGYO K.K. of a solid component 30%) were added as stirred at room temperatures. By heating thus obtained solution in the constant temperature bath at 60° C., a 30% methanol solution of colloidal silica-mixed organosiloxane partial hydrolyzate of a weight-average molecular weight 1,600 was obtained. This shall be referred to as AB-2.

Preparing conditions for A-1 through AB-2 obtained are shown collectively in Table 1. Further, it has been confirmed that organosiloxane partial hydrolyzates obtained in the above are all satisfying the foregoing average composition formula (I).

Next, the emulsification shall be described.

WORKING ASPECT 1

To 50 parts of 80% toluene solution of the (A) constituent obtained in Preparation Example A-1, 4 parts of dodecylbenzene sodium carbonate sulfonate as the emulsifying agent were added and they were uniformly stirred. Thereto, 100 parts of water-dispersed colloidal silica ("SNOWTEX O" by NISSAN KAGAKU KOGYO of solid component 20%) and 50 parts of water were added as being stirred, and thereafter a homogenizer (300 kg/cm$^2$) treatment was carried out to obtain a composition of silicone emulsion coating material.

WORKING ASPECT 2

To 50 parts of the 80% toluene solution of the (A) constituent obtained at Preparation Example A-1, 2 parts of polyoxyethylene nonylphenylether (HLB 11.0) as the polymerization inhibitor and 4 parts of dodecylbenzene sodium carbonate sulfonate as the emulsifying agent were added, and they were uniformly stirred. Thereto, 100 parts of water-dispersed colloidal silica ("SNOWTEX O" by NISSAN KAGAKU KOGYO of solid component 20%) and 50 parts of water were added under stirring and, thereafter the emulsification was carried out through the homogenizer (300 kg/cm$^2$) treatment. Thereafter, a composition of silicone emulsion coating material was obtained by distilling off toluene using a rotary evaporator.

WORKING ASPECT 3

To 100 parts of the 30% mixture alcohol solution of the (A) constituent obtained at Preparation Example A-2, 2 parts of polyoxyethylene nonylphenylether (HLB 12.6) were added as the polymerization inhibitor, they were uniformly stirred, and thereafter alcohol was distilled off by means of the rotary evaporator. To 32 parts of thus obtained residue, 5 parts of dodecylbenzene sodium carbonate sulfonate were added as the emulsifying agent, and they were uniformly stirred. Thereto, 120 parts of water-dispersed colloidal silica ("SNOWTEX O" by NISSAN KAGAKU KOGYO of solid component 20%) were added under stirring, and a composition of silicone emulsion coating material was obtained by carrying out the homogenizer (300 kg/cm$^2$) treatment.

WORKING ASPECT 4

To 100 parts of the 40% methanole solution of the (A) and (B) mixture constituents obtained at Preparation Example AB-1, 3 parts of polyoxyethylene nonylphenylether (HLB 5.7) were added as the polymerization inhibitor, they were uniformly stirred, and thereafter methanol was distilled off by means of the rotary evaporator. To 43 parts of thus obtained residue, 3 parts of polyoxyethylene nonylphenylether (HLB 13.7) were added as the emulsifying agent, and they were stirred well to be uniform. Thereto, 60 parts of water were added under stirring, thereafter the homogenizer (300 kg/cm$^2$) treatment was carried out, and a composition of silicone emulsion coating material was obtained.

WORKING ASPECT 5

To 100 parts of the 30% methanol solution of the (A) and (B) mixture constituents obtained in Preparation Example AB-2, 3 parts of polyoxyethylene nonylphenylether (HLB 14.1) were added as the polymerization inhibitor, they were uniformly stirred, and thereafter methanol was distilled off by means of the rotary evaporator. To 33 parts of thus obtained residue, 3 parts of dodecylbenzene sodium carbonate sulfonate were added as the emulsifying agent, and they were well stirred to be uniform. Thereto, 100 parts of water were added under stirring, thereafter the homogenizer (300 kg/cm$^2$) treatment was carried out, and a composition of silicone emulsion coating material was obtained.

WORKING ASPECT 5

To 100 parts of the 30% mixture alcohol solution of the (A) constituent obtained in Preparation Example A-2, 2 parts of polyoxyethylene nonylphenylether (HLB 12.6) were added as the polymerization prohibitor and, after stirring uniformly, alcohol was distilled off by means of the rotary evaporator. To 32 parts of thus obtained residue, 5 parts of dodecylbenzene sodium carbonate sulfonate were added as the emulsifying agent, and they were stirred uniformly. Thereto, 120 parts of the water-dispersed colloidal silica ("SNOWTEX O" by NISSAN KAGAKU KOGYO of solid component 20%) were added under stirring, and thereafter the emulsification was carried out through the homogenizer (300 kg/cm$^2$) treatment. Thereafter, 6 parts of nonionic urethaneacryl block copolymer (by the firm ROHM & HARSE, commodity name "RM-830", solid component 30%, an aqueous solution of butyl Carbitol/water=28/72 in weight ratio) were added and stirred, and thereby the composition of silicone emulsion coating material was obtained.

WORKING ASPECT 7

To 50 parts of the 80% toluene solution of the (A) constituent obtained in Preparation Example A-1, 4 parts of dodecylbenzene sodium carbonate sulfonate were added as the emulsifying agent, and they were stirred uniformly. Threreto, 100 parts of the water-dispersed colloidal silica ("SNOWTEX O" by NISSAN KAGAKU KOGYO of soild component 20%) and 50 parts of water were added under stirring, and thereafter the emulsification was carried out through the homogenizer (300 kg/cm$^2$) treatment. Thereafter, 64.5 parts of a water-dispersing pigment slurry (by DAINICHI SEIKA, EP-62 White and titanium oxide 62%) were added and stirred, and thereby a composition of silicone emulsion coating material in white color was obtained.

WORKING ASPECT 8

To 100 parts of the 40% methanol solution of the (A) and (B) constituents obtained in Preparation Example AB-1, 3 parts of polyoxyethylene nonylphenylether (HLB 5.7) were added as the polymerization inhibitor and, after stirring uniformly, methanol was distilled off by means of the rotary evaporator. To 43 parts of thus obtained residue, 3 parts of polyoxyethylene nonylphenylether (HLB 13.7) were added as the emulsifying agent, and they were well stirred to be uniform. Thereto, 60 parts of water were added under stirring, and the emulsification was carried out through the homogenizer (300 kg/cm$^2$) treatment. Thereafter, 53.3 parts of a mixture dispersion-treated for 1 hour by a paint shaker of 50 parts of water-dispersing pigment slurry (titanium oxide powder "R-820" by ISHIHARA SANGYO), 5 parts of nonionic urethaneacryl block copolymer ("RM-830" by ROHM & HARSE, solid component 30% and the aqueous solution of butyl Carbitol/water=28/72 in weight ratio) were added and stirred, and thereby a composition of silicone emulsion coating material in white color was obtained.

Further, in the present invention, an (E) constituent and its emulsified substance can be employed in the composition of the invention. Referring thereto, straight-chain dimethyl polysiloxanediol of a weight-average molecular weight Mw=800 (n≈11) is referred to as E-1.

To 50 parts of the straight-chain dimethyl polysiloxanediol of E-1, 5 parts of polyoxyethylene nonylphenolether (HLB 11.0) were added as the emulsifying agent, and they were stirred uniformly. After adding thereto 45 parts of water under stirring, the homogenizer (300 kg/cm$^2$) treatment was carried out, and a silicone diol emulsion was obtained. This is referred to as E-1(E).

A straight-chain dimethyl polysiloxanediol of a weight-average molecular weight Mw=3000 (n≈40) is referred to as E-2. To 50 parts of this E-2 straight-chain dimethyl polysiloxanediol, 5 parts of polyoxyethylene nonylphenolether (HLB 11.0) were added and stirred uniformly. After adding thereto 45 parts of water under stirring, the homogenizer (300 kg/cm$^2$) treatment was carried out, and thereby a silicone diol emulsion was obtained. This is referred to as E-2(E).

WORKING ASPECT 9

To 100 parts of the 40% methanol solution of the colloidal silica mixture (A) constituent obtained in Preparation Example AB-1, 3 parts of (E-1), 1 part of (E-2) and 2 parts of polyoxyethylene nonylphenolether (HLB 5.7) as the polymerization inhibitor were added and, after their stirring to be uniform, methanol was distilled off by means of the rotary evaporator. To 46 parts of thus obtained residue, 2 parts of polyoxyethylene nonylphenolether (HLB 13.7) were added and stirred uniformly. 100 parts of water were added thereto, thereafter the homogenizer (300 kg/cm$^2$) treatment was carried out, and thereby a composition of silicone emulsion coating material was obtained.

WORKING ASPECT 10

To 100 parts of the 30% mixture alcohol solution of the (A) constituent obtained in Preparation Example A-2, 3 parts of (E-1), 1 part of (E-2) and 2 parts of polyoxyethylene nonylphenolether (HLB 14.1) were added and, after stirring to be uniform, alcohol was distilled off by means of the rotary evaporator. To 36 parts of thus obtained residue, 2 parts of dodecylbenzene sodium carbonate sulfonate were added as the emulsifying agent, and they were stirred to be uniform. After adding thereto 80 parts of water under the stirring, the emulsification was carried out through the homogenizier (300 kg/cm²) treatment. Thereafter, 85 parts of the water-dispersed colloidal silica ("SNOWTEX O" by NISSAN KAGAKU KOGYO of solid component 20%) were added and stirred, and thereby a composition of silicone emulsion coating material was obtained.

WORKING ASPECT 11

To 100 parts of the 30% mixture alcohol solution of the (A) constituent obtained in Preparation Example A-2, 2 parts of polyoxyethylene nonylphenolether (HLB 14.1) were added as the polymerization inhibitor and, after stirring to be uniform, alcohol was distilled off by means of the rotary evaporator. To 32 parts of thus obtained residue, 2 parts of dodecylbenzene sodium carbonate sulfonate were added as the emulsifying agent, and they were stirred to be uniform. Thereto, 80 parts of water were added under the stirring and, thereafter, the emulsification was carried out through the homogenizer (300 kg/cm²) treatment. Thereafter, 6 parts of E-1(E) emulsion, 2 parts of E-2(E) emulsion and 85 parts of the water-dispersed colloidal silica ("SNOWTEX O" by NISSAN KAGAKU KOGYO of solid component 20%) were added and stirred, and thereby a composition of silicone emulsion coating material was obtained.

COMPARATIVE EXAMPLE 1

1,000 parts of water and 50 parts of acetone were weighed into a flask to which a stirrer, heating jacket, condenser, dropping funnel and thermometer were mounted, a mixture solution of which was subjected to a hydrolysis at 60° C., while dropping thereinto under the stirring a solution consisting of 44.8 parts (0.3 mol) of methyltrichlorosilane, 38.7 parts (0.3 mol) of dimethyldichlorosilane, 84.6 parts (0.4 mol) of phenyltrichlorosilane, and 200 parts of toluene.

The stirring was ceased after 40 minutes from termination of the dropping, thus reacted solution was transferred into a separating funnel and was left to stand, thereafter a hydrochloric acid water forming a lower one of two-layer separation was removed as separated, next, residual water and hydrochloric acid in toluene solution of organopolysiloxane of an upper layer were removed as distilled off together with an excessive toluene by means of a stripping under a reduced pressure, and thereby a 50% toluene solution of organopolysiloxane containing reactive molecular terminal silanol radical was obtained.

To 50 parts of this toluene solution, 4 parts of dodecylbenzene sodium carbonate sulfonate were added as an emulsifying agent, and they were stirred to be uniform. Thereto, 100 parts of the water-dispersed colloidal silica ("SNOWTEX O" by NISSAN KAGAKU KOGYO of solid component 20%) and 50 parts of water were added under stirring, thereafter the homogenizer (300 kg/cm²) treatment was carried out, and a comparative composition of silicone emulsion coating material was obtained.

COMPARATIVE EXAMPLE 2

1,000 parts of water and 50 parts of acetone were weighed in a flask to which the stirrer, heating jacket, condenser, dropping funnel and thermometer were mounted, a mixture solution of which was subjected to the hydrolysis at 60° C., while dropping thereinto under the stirring the solution consisting of 44.8 parts (0.3 mol) of methyltrichlorosilane, 38.7 parts (0.3 mol) of dimethyldichlorosilane, 84.6 parts (0.4 mol) of phenyltrichlorosilane, and 200 parts of toluene.

The stirring was ceased after 40 minutes from termination of the dropping, thus reacted solution was transferred into a separating funnel and was left to stand, thereafter, a hydrochloric acid water forming a lower one of two-layer separation was removed as separated, next, residual water and hydrochloric acid in toluene solution of organopolysiloxane of an upper layer were removed as distilled off together with an excessive toluene by means of a stripping under a reduced pressure, and thereby the 50% toluene solution of organopolysiloxane containing reactive molecular terminal silanol radical was obtained.

Into a mixture solution formed by adding to 100 parts of the above solution 50 parts of methyltrimethoxysilane and 50 parts of dimethyldimethoxysilane, a solution consisting of 6 parts of dibutyltin dilaurate and 30 parts of toluene was dropped under stirring, during which dropping the alkoxylation of silanol radical was carried out at 60° C. The stirring was ceased after 40 minutes from termination of the dropping, dibutyltin dilaurate and methanol were removed as distilled off together with excessive toluene, and thereby an 80% toluene solution of organosiloxane partial hydrolyzate containing reactive molecule terminal methoxydo radical of a weight-average molecular weight of 2300 was obtained.

To 50 parts of this toluene solution, 4 parts of dodecylbenzene sodium carbonate sulfonate were added as the emulsifying agent, and they were stirred uniformly. Thereto, 100 parts of the water-dispersed colloidal silica ("SNOWTEX O" by NISSAN KAGAKU KOGYO of solid component 20%) and 50 parts of water were added under stirring and, carrying out the homogenizer (300 kg/cm²) treatment, a composition of silicone emulsion coating material for comparison was obtained.

COMPARATIVE EXAMPLE 3

To 100 parts of the 30% alcohol solution of the (A) constituent obtained in Preparation Example A-2, 2 parts of polyoxyethylene nonylphenolether (HLB 12.6) were added as the polymerization inhibitor, they were stirred uniformly, and thereafter alcohol was distilled off by means of the rotary evaporator. To 32 parts of thus obtained residue, 5 parts of dodecylbenzene sodium carbonate sulfonate were added as the emulsifying agent, and they were stirred uniformly. After adding therego 96 parts of water, the homogenizer (300 kg/cm²) treatment was carried out, and thereby a composition of silicone emulsion coating material for comparison was obtained.

COMPARATIVE EXAMPLE 4

Into a flask to which a stirrer, heating jacket, condenser, dropping funnel and thermometer were mounted, 1,000 parts of water and 50 parts of acetone were weighed, a mixture solution of which was subjected to the hydrolysis at 100° C., while dropping under the stirring the solution consisting of 35 44.8 parts (0.3 mol) of methyltrichlorosilane, 38.7 parts (0.3 mol) of dimethyldichlorosilane, 84.6 parts (0.4 mol) of phenyltrichlorosilane, and 200 parts of toluene.

The stirring was ceased after 2 hours from termination of the dropping, thus reacted solution was transferred into a separating funnel and was left to stand, thereafter a hydrochloric acid water forming a lower one of two-layer separation was removed as separated, next, residual water and hydrochloric acid in toluene solution of organosiloxane of an upper layer were removed as distilled off together with an excessive toluene by means of a stripping under a reduced pressure, and thereby the 50% toluene solution of organopolysiloxane containing reactive molecular terminal silanol radical was obtained.

Into a mixture solution formed by adding to 100 parts of the above solution 5 parts of methyltorimethoxysilane and 5 parts of dimethyldimethoxysilane, a solution consisting of 0.6 parts of dibutyltin dilaurate and 10 parts of toluene was dropped under stirring, during which the alkoxylation of silanol radical was carried out at 60° C. The stirring was ceased after 40 minutes from termination of the dropping, dibutyltin dilaurate and methanol were removed as distilled off together with excessive toluene, and thereby an 80% toluene solution of organosiloxane partial hydrolyzate of a weight-average molecular weight of 8,000 was obtained. This is referred to as a comparison A-1.

To 50 parts of this toluene solution, 4 parts of dodecyl-benzene sodium carbonate sulfonate were added as the emulsifying agent, and they were stirred uniformly. After adding thereto 100 parts of the water-dispersed colloidal silica ("SNOWTEX O" by NISSAN KAGAKU KOGYO of solid component 20%) and 50 parts of water were added under stirring, the homogenizer (300 kg/cm$^2$) treatment was carried out, and thereby a composition of silicone emulsion coating material for the comparison was obtained.

Characteristic properties of the compositions of silicone emulsion coating material obtained in the foregoing Working Aspects and Comparative Examples were evaluated through processes as in the followings.

Emulsification Stability

Emulsification state of the coating material compositions of the respective examples was visually observed after 1 month and 6 months from the emulsification, and the evaluation was made under such criterion as in the followings:

○: Uniformly opaque white liquid, without any condensed precipitate.

Δ: Uniformly opaque white liquid, with a trace amount of condensed precipitate.

X: Ununiform phase separation has occurred, with a precipitate.

Film-forming Properties:

The coating material composition of the respective examples was applied to a surface of a pylex plate with a bar coater to be 1 μm thick in the dried film, and was dried at room temperatures, the state of which dried film was visually observed and evaluated under the following criterion:

○: Continuously transparent film.

X: Discontinuous opaque film (white turbidity due to the phase separation and condensation, except a white turbidity due to such coarse particles as pigments).

Heat Hardening Properties:

The coating material composition of the respective examples was applied to a surface of a pylex plate with a bar coater to be 1 μm thick in the dried film and was dried at room tempertures, thereafter a hardened film formed as hardened at 150° C. for 30 minutes was scrubbed with a tip of finger nail, the hardened film after being scrubbed was visually observed, and the evaluation was made under the following criterion:

○: No scratch remains.

X : A scratch remains.

Further, in the case where no scratch remains, the pencil hardness of the hardened film was measured in accordance with JIS-K5400.

Room-Temperature Hardening Properties:

The coating material composition of the respective samples was applied to a surface of a pylex plate with a bar coater to be 1 μm thick in the dried film and was dried at room temperatures, thereafter a hardened film formed by hardening the dried film for 1 week in a constant-temperature constant-humidity bath set at a temperature of 40° C. and a humidity of 90% was scrubbed with the tip of finger nail, the hardened film after being scrubbed was visually observed, and the evaluation was made under the following criterion:

○: No scratch remains.

X: A scratch remains.

Further, in the case where no scratch remains, the pencil hardness of the hardened film was measured in accordance with JIS-K5400.

Resistance to Cracking:

The coating material composition of the respective samples was applied to a surface of alumina plate with a bar coater to be 1 μm, 5 μm or 20 μm thick in the dried film and dried at room temperatures, thereafter the appearance of a hardened film formed by hardening the dried film at 150° C. for 30 minutes was visually observed, and the evaluation was made under the following criterion:

○: No crack.

Δ: Locally minute crack has occurred.

X: Extensively crack has occurred.

Adherence:

A coating material composition containing a hardening catalyst prepared by further adding to the coating material composition of the respective examples, 5 parts of potassium acetate (hardening catalyst) of 10 wt. % with respect to 100 parts of the (A) constituent within the composition, was applied to one surface of a pylex plate of a size 30×30 mm with a bar coater to be 1 μm thick in the dried film, and was dried at room temperatures, and thereafter the dried film was hardened for 1 week within a constant-temperature constant-humidity bath set at a temperature of 40° C. and at a humidity of 90%, the adherence of which hardened film thus formed was evaluated through a peeling test with check-pattern adhesive tape (using cellophane tape).

Weatherability:

The coating material composition of the respective examples was applied to one surface of a pylex plate with a bar coater to be 1 μm thick in the dried film and was dried at room temperatures, thereafter a test piece obtained by hardening the dried film at 150° C. for 30 minutes was subjected to an accelerated weathering test for 1,200 hours with a sun-shine super long life weather meter ("WEL-SUN-HC" by SUGA TESTING EQUIPMENTS) employed, and the film observed as having no change was regarded excellent. Formulas of the coating material compositions of the respective examples are shown in following Tables 2 and 3 and result of their evaluation are shown in following Tables 4 and 5.

Next, the coated articles have been manufactured as in the followings:

WORKING ASPECTS 12–35

To the respective compositions of silicone emulsion coating material as obtained in Working Aspects 2 and 9, respectively, 5 parts of an aqueous solution of potassium acetate (hardening catalyst) of 10 wt. % with respect to 100 parts of the (A) constituent within these compositions were added, and thereby respective hardening-catalyst containing coating material compositions were obtained.

The respective hardening-catalyst containing coating material compositions thus obtained were applied to such substrates as follows by the bar coater to be 1 μm or 20 μm thick in dried film and were dried at room temperatures, and the coated articles were obtained by having the dried films hardened for 1 week within a constant-temperature constant-humidity bath set at a temperature 400° C. and at a humidity 90%.

With respect to the respective coated articles, the film characteristic properties (adherence, resistance to cracking) were evaluated through the foregoing process. Further, as additional evaluation item, the film of the test piece tested for 1 hour in boiling tap water and then left stand for 1 hour was visually observed, and the one having no change was regarded excellent.

For the substrate, such ones as follows were used:

Stainless plate: SUS 304 plate (150×70×0.5 mm).

Organic coated plate: Aluminum plate coated by thermosetting acrylic resin (150×70×2 mm).

PC plate: Polycarbonate plate (150×70×5 mm).

Slate Plate: Fibre reinforced cement plate (150×70×3 mm).

Inorganic coated plate: A plate obtained by applying a 30% alcohol solution (A-2) of the (A) constituent obtained in Preparation Example A-2 to the pylex plate (100×100×1 mm) with the bar coater to be 1 μm thick in the dried film, drying the film at room temperatures, and thereafter hardening the film at 150° C. for 20 minutes.

FRP plate: Glass fibre reinforced acrylic plate (150×70×5 mm).

Further, as occasion demands, epoxy series sealer ("EPOLO E SEALER" by ISAMU TORYO K.K.) was used as a primer.

Evaluation results of the coated articles are shown in following Tables 6–9.

TABLE 1

| Prep. Ex. No. | A-1 | A-2 | AB-1 | AB-2 |
|---|---|---|---|---|
| Starting Mat. | chlorosilane | alkoxysilane | alkoxysilane | alkoxysilane |
| Solid Comp. (%) | 80 | 30 | 40 | 30 |
| Water Ratio (*) | — | 1.00 | 0.87 | 1.54 |
| Silica(%)/(A) | — | — | 15 | 58 |

(*): Mol ratio per 1 mol equivalent weight of alkoxy group in alkoxysilane.

TABLE 2

| Working Aspect | 1 | 2 | 3 | 4 | 5 | 6 | 7 | 8 | 9 | 10 | 11 |
|---|---|---|---|---|---|---|---|---|---|---|---|
| (A) Constituent | A-1 | A-1 | A-2 | AB-1 | AB-2 | A-2 | A-1 | AB-1 | AB-1 | A-2 | A-2 |
| (B) Constituent | coll. sili. | coll. sili. | coll. sili. | AB-1 | AB-2 | coll. sili. | coll. sili. | AB-1 | AB-1 | coll. sili. | coll. sili. |
| Silica (%)/(A) | 50 | 50 | 80 | 15 | 58 | 80 | 50 | 15 | 15 | 57 | 57 |
| Emulsif. Agent (%)/(A + B) | 7 | 7 | 9 | 8 | 10 | 9 | 7 | 7 | 5 | 4 | 3 |
| Water (%)/Total Am. | 64 | 68 | 60 | 57 | 74 | 60 | 57 | 53 | 68 | 73 | 73 |
| Diol (%)/(A + B) | — | — | — | — | — | — | — | — | 10 | 9 | 9 |
| Polymeriz. Prohibitor (%)/(A + B) | — | 3 | 4 | 8 | 10 | 4 | — | 2 | 5 | 4 | 3 |
| RM-830 (%)/(A + B) | — | — | — | — | — | 3 | — | 2 | — | — | — |
| Pigment (TiO) | — | — | — | — | — | — | Present | Present | — | — | — |

TABLE 3

| Comp. Ex. | 1 | 2 | 3 | 4 |
|---|---|---|---|---|
| (A) Constituent | A-1 (*1) | A-1 (*2) | A-2 | Comp'g A-1 |
| (B) Constituent | Coll. Silic. | Coll. Silic. | — | Coll. Silic. |
| Silica(%)/(A) | 50 | 50 | — | 50 |
| Emulsif. Agt. (%)/(A + B) | 7 | 7 | 9 | 7 |
| Water(%)/Total | 64 | 64 | 60 | 64 |
| Polymrz. Prohbtr. (%)/(A + B) | — | — | 4 | — |
| RM-830(%)/(A + B) | — | — | — | — |
| Pigment (TiO) | — | — | — | — |
| Emulsif. Stablty. (aft. 1 month) | — | ○ | ○ | ○ |
| Emulsif. Stablty. (aft. 6 months) | — | ○ | ○ | ○ |
| Film Forming Property | — | ○ | ○ | ○ |
| Harden'g Prop. (Pencil Hardness) | — | below 2 B | below 2 B | below 2 B |
| Weatherability (Δ E) | — | — | — | ○ |
| Remark | Gelated at Emulsif. | | | |

*1 : Molecular end is —OH radical, and has no —OR¹ radical at molecular end.

*2 : Molecular end is —OR¹ radical, and has no —OH radical at molecular end.

TABLE 4

| Working Aspect | 1 | 2 | 3 | 4 | 5 | 6 | 7 | 8 | 9 | 10 | 11 |
|---|---|---|---|---|---|---|---|---|---|---|---|
| Emulsifn. Stability | | | | | | | | | | | |
| 1 mo. | ○ | ○ | ○ | ○ | ○ | ○ | ○ | ○ | ○ | ○ | ○ |
| 6 mo. | Δ | Δ | Δ | Δ | Δ | ○ | Δ | Δ | Δ | Δ | Δ |
| Film Formg. Prop. | ○ | ○ | ○ | ○ | ○ | ○ | ○ | ○ | ○ | ○ | ○ |
| Heat Hard. Prop. | | | | | | | | | | | |
| Eval. | ○ | ○ | ○ | ○ | ○ | ○ | ○ | ○ | ○ | ○ | ○ |
| Pen. Hd. | HB | HB | F | HB | F | F | 1 H | 1 H | F | 1 H | 1 H |
| Rm. Temp. Hgd. Prop. | | | | | | | | | | | |
| Eval, | x | x | x | x | x | x | x | x | ○ | ○ | ○ |
| Pen, Hd, | — | — | — | — | — | — | — | — | HB | 1 H | F |
| Resist. to Crackg. Prop. | | | | | | | | | | | |
| 1 μm | ○ | ○ | ○ | ○ | ○ | ○ | ○ | ○ | ○ | ○ | ○ |
| 5 μm | ○ | ○ | ○ | ○ | Δ | ○ | ○ | ○ | ○ | ○ | ○ |
| 20 μm | x | x | x | x | x | x | x | x | ○ | ○ | ○ |
| Adherence | 100/100 | 100/100 | 100/100 | 100/100 | 100/100 | 100/100 | 100/100 | 100/100 | 100/100 | 100/100 | 100/100 |
| Weatherability | 0.9 | 1.1 | 1 | 1.5 | 1.4 | 1.2 | 1.5 | 1.4 | 1.8 | 1.6 | 1.8 |

TABLE 5

| Comparative Example | 1 | 2 | 3 | 4 |
|---|---|---|---|---|
| Emulsification Stability | | | | |
| 1 mo. | — | ○ | ○ | Δ |
| 6 mo. | — | ○ | Δ | x |
| Film Forming Property | — | ○ | ○ | ○ |
| Heat Hard. Property | | | | |
| Eval. | — | x | ○ | ○ |
| Pen. Hd. | — | — | below 2B | below 2B |
| Rm. Temp. Hard. Property | | | | |
| Eval. | — | x | x | x |
| Pen. Hd. | — | — | — | — |
| Resist. to Crackg. Prop. | | | | |
| 1 μm | — | — | ○ | ○ |
| 5 μm | — | — | x | ○ |
| 20 μm | — | — | x | x |
| Adherence | — | — | 100/100 | 100/100 |
| Weatherability | — | — | 1.2 | 1.1 |
| Remark | Gelated at emulsf. | | | |

TABLE 6

| Working Asp. | 12 | 13 | 14 | 15 | 16 | 17 | 18 | 19 |
|---|---|---|---|---|---|---|---|---|
| Substrate | stainless plt. | stainless plt. | acryl. resin coated plt. | acryl. resin coated plt. | PC plt. | PC plt. | slate plt. | slate plt. |
| Coating material Primer | Work. Asp. 2 pres. | Work. Asp. 2 nil | Work. Asp. 2 pres. | Work. Asp. 2 nil | Work. Asp. 2 pres. | Work. Asp. 2 nil | Work. Asp. 2 pres | Work. Asp. 2 nil |
| Adherence | | | | | | | | |
| 1 μm | 100/100 | 0/100 | 100/100 | 80/100 | 100/100 | 0/100 | 100/100 | 0/100 |
| 20 μm | 100/100 | 0/100 | 100/100 | 30/100 | 100/100 | 0/100 | 100/100 | 0/100 |
| resist. to boiling. water | | | | | | | | |
| 1 μm | excel. | entir. peeled | excel. | entir. peeled | excel. | entir. peeled | excel. | entir. peeled |
| 20 μm | entir. crack. | entir. peeled | entir. crack. | entir. peeled | entir. crack. | entir. peeled | entir. crack. | entir. peeled |

TABLE 7

| Working Asp. | 20 | 21 | 22 | 23 |
|---|---|---|---|---|
| Substrate | inorg. coated plt. | inorg. coated plt. | FRP plt. | FRP plt. |
| Coating material | Work. Asp. 2 | Work. Asp. 2 | Work. Asp. 2 | Work. Asp. 2 |
| Primer | pres. | nil | pres. | nil |
| Adherence | | | | |
| 1 μm | 100/100 | 100/100 | 100/100 | 100/100 |
| 20 μm | 100/100 | 90/100 | 100/100 | 20/100 |
| Resist. to boilng. water | | | | |
| 1 μm | excel. | excel. | excel. | entir. peeled |
| 20 μm | entir. crack. | entir. crack. | entir. crack. | entir. peeled |

TABLE 8

| Working Asp. | 24 | 25 | 26 | 27 | 28 | 29 | 30 | 31 |
|---|---|---|---|---|---|---|---|---|
| Substrate | stainless plt. | stainless plt. | acryl. resin coated plt. | acryl. resin coated plt. | PC plt. | PC plt. | slate plt. | slate plt. |
| Coating material | Work. Asp. 9 | Work. Asp. 9 | Work. Asp. 9 | Work. Asp. 9 | Work. Asp. 9 | Work. Asp. 9 | Work. Asp. 9 | Work. Asp. 9 |
| Primer | pres. | nil | pres. | nil | pres. | nil | pres. | nil |
| Adherence | | | | | | | | |
| 1 μm | 100/100 | 10/100 | 100/100 | 100/100 | 100/100 | 0/100 | 100/100 | 0/100 |
| 20 μm | 100/100 | 0/100 | 100/100 | 50/100 | 100/100 | 0/100 | 100/100 | 0/100 |
| Resist. to boiling. water | | | | | | | | |
| 1 μm | excel. | entir. peeled | excel. | entir. peeled | excel. | entir. peeled | excel. | entir. peeled |
| 20 μm | excel. | entir. peeled | excel. | entir. peeled | excel. | entir. peeled | excel. | entir. peeled |

TABLE 9

| Working Asp. | 32 | 33 | 34 | 35 |
|---|---|---|---|---|
| Substrate | inorg. coated plt. | inorg. coated plt. | FRP plt. | FRP plt. |
| Coating material | Work. Asp. 9 | Work. Asp. 9 | Work. Asp. 9 | Work. Asp. 9 |
| Primer | pres. | nil | pres. | nil |
| Adherence | | | | |
| 1 μm | 100/100 | 100/100 | 100/100 | 70/100 |
| 20 μm | 100/100 | 90/100 | 100/100 | 30/100 |
| Resist. to boilng. water | | | | |
| 1 μm | excel. | entir. peeled | excel. | entir. peeled |
| 20 μm | excel. | entir. peeled | excel. | entir. peeled |

We claim:

1. A composition of silicone emulsion coating material comprising following (A), (B), (C) and (D) constituents:
(A) organosiloxane partial hydrolyzate represented by an average composition formula of $R^2{}_a SiO_b(OR^1)_c(OH)_d$ (wherein $R^1$ and $R^2$ denote monovalent hydrocarbon radicals and a, b, c and d are figures satisfying the relationship of $a+2b+c+d=4$, $0 \leq a < 3$, $0 < b < 2$, $0 < c < 4$ and $0 < d < 4$) and having a weight-average molecular weight of 600–5,000 in polystyrene conversion; (B) colloidal silica; (C) an emulsifying agent; and (D) water.

2. The composition as set forth in claim 1, wherein the (B) constituent has a silica component at a ratio of 5–100 wt. % with respect to the (A) constituent.

3. The composition as set forth in claim 1, wherein the (D) constituent is of a content at a ratio of 50–90 wt. % in the total weight of the composition of silicone emulsion coating material.

4. The composition as set forth in claim 1, which further comprises nonionic urethane acryl block copolymer.

5. The composition as set forth in claim 4, wherein nonionic urethane acryl block copolymer is of a content at a ratio of 0.1–10 wt. % with respect to the sum weight of the (A) constituent and the silica component in the (B) constituent.

6. The composition as set forth in claim 1 which further comprises a pigment.

7. The composition as set forth in claim 1 which further comprises a following (E) constituent:
(E) a straight-chain polysiloxane diol containing hydroxyl groups at both ends and represented by general formula $HO(R^3{}_2SiO)_nH$, wherein $R_3$ denotes monovalent hydrocarbon radical and n is an integer of at least 3.

8. The composition as set forth in claim 7 wherein n in the general formula representing the straight-chain polysiloxane diol containing hydroxyl radicals at both ends is in a range of $3 \leq n \leq 50$.

9. The composition as set forth in claim 7 wherein the (E) constituent is of a content at a ratio of 1–50 wt. % with respect to the sum weight of the (A) constituent and the silica component in the (B) constituent.

10. A method for manufacturing a composition of silicone emulsion coating material, comprising the steps of obtaining a mixture containing the following (A) and (B) constituents by mixing hydrolyzing organosilane represented by a general formula $R^2{}_nSi(OR^1)_{4-n}$, wherein $R^1$ and $R^2$ denote monovalent hydrocarbon radicals and n is an integer of 0–3, acidic colloidal silica and the following (D) constituent; and mixing the obtained mixture with at least the following (C) constituent among the (C) constituent and an additional portion of the D constituent:
(A) organosiloxane partial hydrolyzate represented by an average composition formula of $R^2{}_aSiO_b(OR^1)_c(OH)_d$, wherein $R^1$ and $R^2$ denote monovalent hydrocarbon radicals and a, b, c and d are figures satisfying the relationship $a+2b+c+d=4$, $0\leq a<3$, $0<b<2$, $0<c<4$ and $0<d<4$ and having a weight-average molecular weight of 600–5,000 in polystyrene conversion; (B) colloidal silica; (C) emulsifying agent; and (D) water.

11. The method as set forth in claim 10 wherein the (D) constituent used in mixing the hydrolyzing organosilane, acidic colloidal silica and (D) constituent is in an amount at a ratio of 0.3–2.0 mol per 1 mol equivalent weight of $OR^1$ radical in the hydrolyzing organosilane.

12. A method for manufacturing a composition of silicone emulsion coating material, comprising the steps of obtaining a desolvated substance by desolvating an organic solvent from a mixture of the following (A) and (B) constituents containing the organic solvent, and mixing the desolvated substance with the following (C) and (D) constituents:

(A) organosiloxane partial hydrolyzate represented by an average composition formula $R^2_a SiO_b(OR^1)_c(OH)_d$, wherein $R^1$ and $R^2$ denote monovalent hydrocarbon radicals, and a, b, c and d are figures satisfying the relationship of $a+2b+c+d=4$, $0\leq a<3$, $0<b<2$, $0<c<4$ and $0<d<4$ and having a weight-average molecular weight of 600–5,000 in polystyrene conversion; (B) colloidal silica; (C) emulsifying agent; and (D) water.

13. The method as set forth in claim 10 or 12 which further comprises the steps of obtaining a pigment base by mixing nonionic urethane acryl block copolymer, (D) constituent and pigment, and adding the pigment base.

14. A coated article having an applied and hardened film of a composition of silicone emulsion coating material consisting of following (A), (B), (C) and (D) constituents:

(A) organosiloxane partial hydrolyzate represented by an average composition formula $R^2_a SiO_b(OR^1)_c(OH)_d$, wherein $R^1$ and $R^2$ denote monovalent hydrocarbon radicals, and a, b, c and d are figures satisfying the relationship of $a+2b+c+d=4$, $0\leq a<3$, $0<b<2$, $0<c<4$ ad $0<d<4$ and having a weight-average molecular weight of 600–5,000 in polystyrene conversion; (B) colloidal silica; (C) emulsifying agent; and (D) water.

* * * * *